United States Patent
Cheng et al.

(10) Patent No.: US 10,509,272 B2
(45) Date of Patent: Dec. 17, 2019

(54) DISPLAY PANEL AND DISPLAY APPARATUS

(71) Applicant: BOE TECHNOLOGY GROUP CO., LTD., Beijing (CN)

(72) Inventors: Hongfei Cheng, Beijing (CN); Jianbo Xian, Beijing (CN); Xueguang Hao, Beijing (CN); Yuxin Zhang, Beijing (CN); Yong Hu, Beijing (CN)

(73) Assignee: BOE TECHNOLOGY GROUP CO., LTD., Beijing (CN)

( * ) Notice: Subject to any disclaimer, the term of this patent is extended or adjusted under 35 U.S.C. 154(b) by 81 days.

(21) Appl. No.: 15/545,291

(22) PCT Filed: Jan. 23, 2017

(86) PCT No.: PCT/CN2017/072183
§ 371 (c)(1),
(2) Date: Jul. 20, 2017

(87) PCT Pub. No.: WO2017/206532
PCT Pub. Date: Dec. 7, 2017

(65) Prior Publication Data
US 2018/0217455 A1    Aug. 2, 2018

(30) Foreign Application Priority Data
Jun. 3, 2016 (CN) .................. 2016 2 0537208 U

(51) Int. Cl.
G02F 1/1343 (2006.01)
G02F 1/1337 (2006.01)

(52) U.S. Cl.
CPC ...... *G02F 1/134363* (2013.01); *G02F 1/1337* (2013.01); *G02F 2201/121* (2013.01); *G02F 2201/123* (2013.01)

(58) Field of Classification Search
CPC ............ G02F 1/134363; G02F 1/1337; G02F 1/13394; G02F 1/133707; G02F 2001/134318
See application file for complete search history.

(56) References Cited

U.S. PATENT DOCUMENTS

| | | | |
|---|---|---|---|
| 9,235,088 B1 | 1/2016 | Hao | |
| 2005/0140916 A1* | 6/2005 | Kume | G02F 1/133753 349/156 |

(Continued)

FOREIGN PATENT DOCUMENTS

| | | |
|---|---|---|
| CN | 101013216 A | 8/2007 |
| CN | 102033366 A | 4/2011 |
| CN | 205899210 U | 1/2017 |

OTHER PUBLICATIONS

First Chinese Office Action, for Chinese Patent Application No. 201620537208.1, dated Sep. 19, 2016, 4 pages.

(Continued)

*Primary Examiner* — Michael H Caley
*Assistant Examiner* — Mariam Qureshi
(74) *Attorney, Agent, or Firm* — Kinney & Lange, P.A.

(57) ABSTRACT

A display panel and a display apparatus includes the display panel. The display panel includes a first substrate, a second substrate and a liquid crystal layer between the first substrate and the second substrate. The first substrate and the second substrate are disposed opposite to each other, the first substrate comprises a pixel electrode, the second substrate comprises a common electrode, and the common electrode is formed with an opening.

13 Claims, 3 Drawing Sheets

(56) References Cited

U.S. PATENT DOCUMENTS

| | | | |
|---|---|---|---|
| 2007/0177096 A1 | 8/2007 | Uchida et al. | |
| 2008/0111964 A1* | 5/2008 | Shirasaka | G02F 1/13394 349/155 |
| 2012/0262652 A1* | 10/2012 | Kikuchi | G02B 5/223 349/96 |
| 2013/0027649 A1* | 1/2013 | Tasaka | G02F 1/133707 349/139 |
| 2015/0198835 A1* | 7/2015 | Kwon | G02F 1/13394 349/139 |

OTHER PUBLICATIONS

International Search Report and Written Opinion, for PCT Patent Application No. PCT/CN2017/072183, dated Apr. 20, 2017, 23 pages.

\* cited by examiner

DISPLAY PANEL AND DISPLAY APPARATUS

CROSS-REFERENCE TO RELATED APPLICATIONS

This application is a Section 371 National Stage Application of International Application No. PCT/CN2017/072183, filed on 23 Jan. 2017, entitled "DISPLAY PANEL AND DISPLAY APPARATUS", which has not yet published, which claims priority to Chinese Application No. 201620537208.1, filed on 3 Jun. 2016, incorporated herein by reference in their entirety.

BACKGROUND

1. Technical Field

Embodiments of the present invention relate to a display panel and a display apparatus.

2. Description of the Related Art

A thin film transistor liquid crystal display (TFT-LCD) is a flat panel display, for example a liquid crystal television, a mobile telephone, a personal digital assistant (PDA), a digital camera, a computer screen or a notebook computer screen or the like.

Generally, the liquid crystal display comprises a housing, a liquid crystal display panel disposed in the housing and a backlight module disposed in the housing. The liquid crystal display panel of the thin film transistor liquid crystal display comprises a thin film transistor (TFT) array substrate, a color filter (CF) substrate, and a liquid crystal layer disposed between the two substrates. Liquid crystals are filled between the array substrate and the color filter substrate. A deflection of liquid crystal molecules is controlled by an electric field, so as to control intensity of light, thereby displaying an image in cooperation with the color filter substrate. A liquid crystal panel in a vertically aligned mode is widely applied in the liquid crystal television.

SUMMARY

Embodiments of the present disclosure provide a display panel comprising: a first substrate, a second substrate and a liquid crystal layer between the first substrate and the second substrate, wherein:

the first substrate and the second substrate are disposed opposite to each other, the first substrate comprises a pixel electrode, the second substrate comprises a common electrode, and the common electrode is formed with an opening.

According to embodiments of the present disclosure, the pixel electrode has a rectangular shape, and a length of a short side of the pixel electrode is greater than ¼ of a length of a long side of the pixel electrode and is less than ½ of the length of the long side of the pixel electrode.

According to embodiments of the present disclosure, the opening has a circular shape.

According to embodiments of the present disclosure, the pixel electrode has a rectangular shape, and a diameter of the opening is greater than ⅔ of a length of a short side of the pixel electrode and is less than the length of the short side of the pixel electrode.

According to embodiments of the present disclosure, a center of the opening is disposed to correspond to a center of the pixel electrode.

According to embodiments of the present disclosure, the first substrate is further provided with a first orientation layer, and the pixel electrode is covered by the first orientation layer.

According to embodiments of the present disclosure, the first orientation layer is a vertical orientation layer.

According to embodiments of the present disclosure, the second substrate is further provided with a second orientation layer, and the common electrode and the opening are covered by the second orientation layer.

According to embodiments of the present disclosure, the second orientation layer is a vertical orientation layer.

According to embodiments of the present disclosure, protrusions are disposed outside the pixel electrode.

According to embodiments of the present disclosure, the protrusions have a height of 2 µm to 5 µm.

According to embodiments of the present disclosure, the protrusions are disposed outside corners of the pixel electrode, respectively.

According to embodiments of the present disclosure, the liquid crystal layer is a liquid crystal layer having negative dielectric anisotropy.

According to embodiments of the present disclosure, the liquid crystal layer is a liquid crystal layer doped with a chiral agent.

According to embodiments of the present disclosure, a center of the opening coincides with a center of the pixel electrode when viewed in a direction perpendicular to the first or second substrate.

Embodiments of the present invention also provide a display apparatus comprising the above-mentioned display panel.

DETAILED DESCRIPTION OF THE EMBODIMENTS

The objects, technical solutions and advantages of the present invention will be apparent and more readily appreciated from the following description of embodiments taken in conjunction with the accompanying drawings.

It is to be noted that like elements are indicated by like reference signs throughout the accompanying drawings. In the following description, some specific embodiments are provided as only examples of the embodiments of the present invention for description, and should not be interpreted as any limitation on the present invention. Routine structures or configurations will be omitted if they will probably confuse understanding of the present invention. It is noted that shapes and sizes of the parts shown in the figures do not reflect real sizes and proportions, but only schematically illustrate contents of the embodiments of the present invention.

Figure 1:
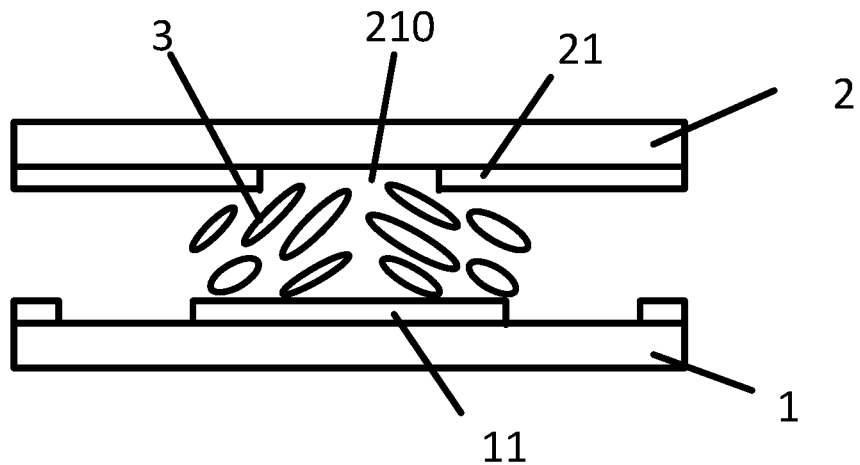
FIG. 1 is a schematic sectional view showing a configuration of a display panel in an embodiment of the present disclosure.

As shown in FIG. 1, embodiments of the present disclosure provide a display panel comprising: a first substrate 1, a second substrate 2 and a liquid crystal layer 3 between the first substrate 1 and the second substrate 2. The first substrate 1 and the second substrate 2 are disposed opposite to each other, the first substrate 1 comprises a pixel electrode 11, the second substrate 2 comprises a common electrode 21, and the common electrode 21 is formed with an opening 210. The pixel electrode 11 may have a rectangular shape. In addition, the common electrode 21 may have a rectangular shape. A center of the opening 210 may coincide with a center of the common electrode 21. The opening 210 may be a through hole passing through the common electrode 21.

Figure 2:
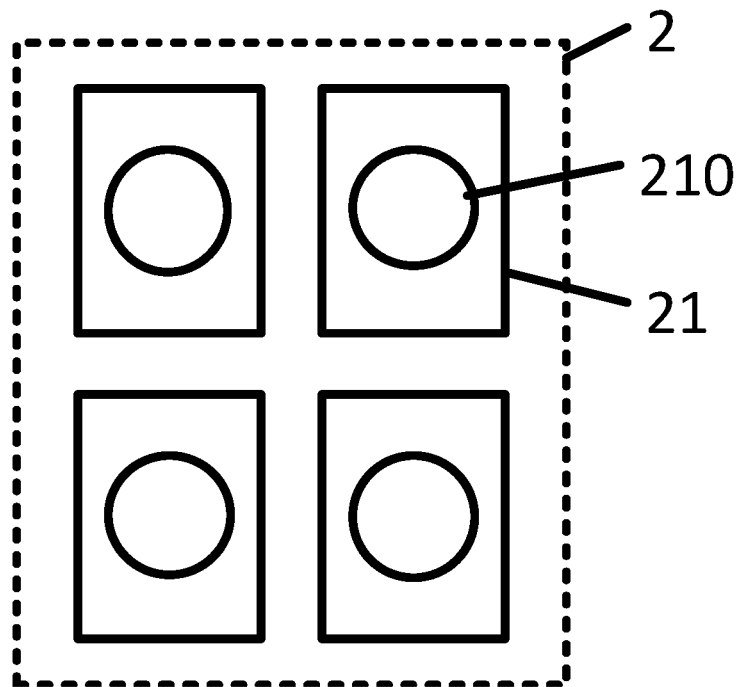
FIG. 2 is a schematic plan view showing the configuration of the display panel in the embodiment of the present disclosure.

As shown in FIG. 2, in the embodiment of the present disclosure, by forming the opening 210 in the common electrode 21, an arrangement direction of molecules of the liquid crystal in a pixel region can be controlled when a voltage is applied, which improves a transmittance and a luminance uniformity of the display panel. In the embodiment of the present disclosure, in order to improve stability of arrangement of the liquid crystals in each pixel unit, a shape of the opening 210 is set to be a circular shape. In order to further ensure that the opening formed in the common electrode 21 generates a uniform influence on an arrangement of liquid crystal molecules in a region where the pixel unit is located, a diameter of the opening is greater than ⅔ of a length of a short side of the pixel electrode and is less than the length of the short side of the pixel electrode. In order to further ensure uniformity of arrangement of the liquid crystals in each pixel unit, the center of the opening 210 is disposed to correspond to a center of the pixel electrode 21. For example, the center of the opening 210 coincides with the center of the pixel electrode 11 when viewed in a direction perpendicular to the first substrate 1 or the second substrate 2.

In the embodiment of the present disclosure, a length of a short side of the pixel electrode is greater than ¼ of a length of a long side of the pixel electrode and is less than ½ of the length of the long side of the pixel electrode.

Figure 3:
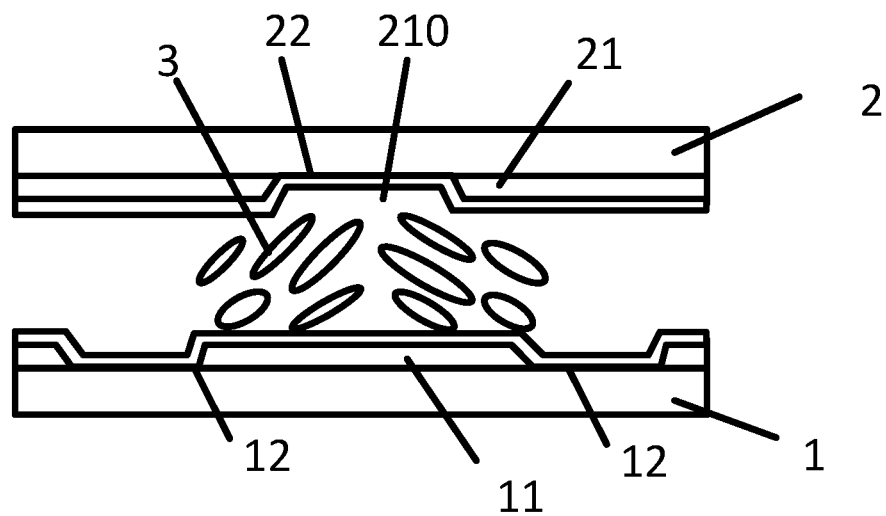
FIG. 3 is a schematic sectional view showing a configuration of a display panel in an embodiment of the present disclosure.

In the embodiment of the present disclosure, as shown in FIG. 3, the first substrate 1 is further provided with a first orientation layer 12, and the pixel electrode 11 is covered by the first orientation layer 12. The first orientation layer 12 may be a vertical orientation layer. The second substrate 2 is further provided with a second orientation layer 22, and the common electrode 21 and the opening 210 are covered by the second orientation layer 22. The second orientation layer 22 is a vertical orientation layer.

Figure 4:
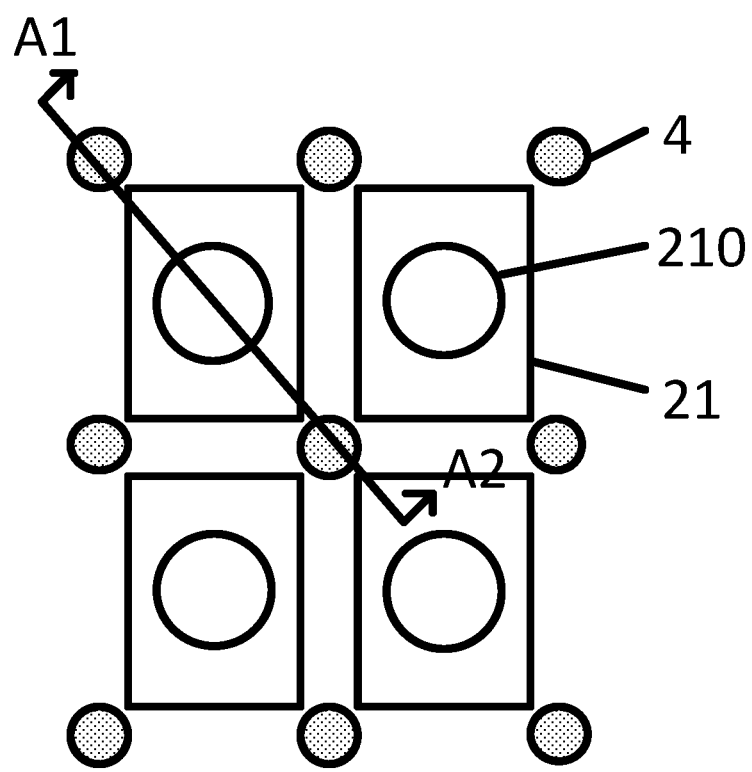
FIG. 4 is a schematic plan view showing the configuration of the display panel in the embodiment of the present disclosure.
Figure 5:
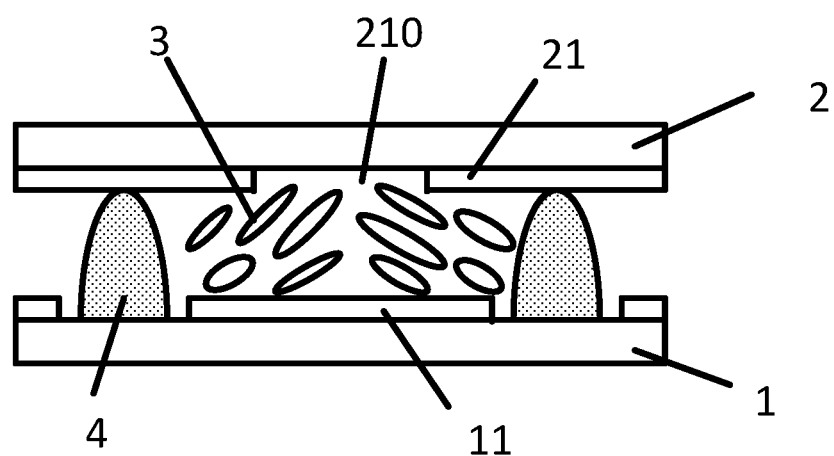
FIG. 5 is a schematic sectional view, taken along the direction A-A in FIG. 4, which shows the configuration of the display panel in the embodiment of the present disclosure.

As shown in FIG. 4 and FIG. 5, in an embodiment of the present disclosure, protrusions 4 are disposed outside the pixel electrode. The protrusions 4 function to support the first substrate 1 and the second substrate 2. The protrusions 4 may have a height of 2 μm to 5 μm. The protrusions 4 are disposed outside corners of the pixel electrode 11, respectively. In an embodiment of the present disclosure, the liquid crystal layer is a liquid crystal layer having negative dielectric anisotropy, or a liquid crystal layer having negative dielectric anisotropy and doped with a chiral agent.

In an embodiment of the present disclosure, the liquid crystal is a liquid crystal having negative dielectric anisotropy. When no voltage is applied between the pixel electrode 11 and the common electrode 21, liquid crystal molecules are arranged perpendicular to the first substrate 1 and the second substrate 2. When a voltage is applied between the pixel electrode 11 and the common electrode 21, an electric field between the pixel electrode 11 and the common electrode 21 has a component that is parallel to the first substrate 1 and the second substrate 2 as the common electrode 21 is formed with the circular opening. When the liquid crystal molecules having negative dielectric anisotropy are changed from an arrangement state where the molecules are perpendicular to the first substrate 1 and the second substrate 2 to an arrangement state where the molecules are parallel to the first substrate 1 and the second substrate 2, they can be uniformly changed without occurrence of dislocation.

In FIG. 5, the first orientation layer 12 and the second orientation layer 22 are omitted. The protrusions 4 are disposed on the first orientation layer. In the embodiments of the present disclosure, the protrusions 4 are disposed outside corners of the pixel electrode 11, respectively. Therefore, an influence of the protrusions 4 on an arrangement of the liquid crystal in a region where the pixel unit is located can be reduced and thus the transmittance and the luminance uniformity are further increased.

Embodiments of the present disclosure also provide a display apparatus comprising the display panel according to any one of the abovementioned embodiments. The display apparatus may comprise any products or parts having display function, such as a liquid crystal panel, a mobile phone, a tablet computer, a TV, a display, a notebook computer, a digital frame, and a navigator. With the abovementioned display panel, by forming the opening in the common electrode, an arrangement direction of molecules of the liquid crystal in a pixel region can be controlled when a voltage is applied, so that a transmittance of the display apparatus according to the embodiments of the present invention can be increased and a luminance uniformity of the display apparatus according to the embodiments of the present disclosure can be improved.

Therefore, with the display panel and the display apparatus according to the embodiments of the present disclosure, by forming the opening in the common electrode, an arrangement direction of molecules of the liquid crystal in a pixel region can be controlled when a voltage is applied, so that a transmittance can be increased and a luminance uniformity can be improved.

The above embodiments are only used to explain the present invention, and should not be construed to limit the present invention. It will be understood by those skilled in the art that various changes and modifications may be made therein without departing from the spirit of the present invention, the scope of which is defined in the appended claims and their equivalents.

What is claimed is:

1. A display panel comprising:
   a first substrate, a second substrate and a liquid crystal layer between the first substrate and the second substrate, wherein:
   the first substrate and the second substrate are disposed opposite to each other,
   the first substrate comprises a pixel electrode,
   the second substrate comprises a common electrode,
   the common electrode is formed with an opening,
   the opening has a circular shape,
   the pixel electrode has a rectangular shape, and a diameter of the opening is greater than two-thirds of a length of a short side of the pixel electrode and is less than the length of the short side of the pixel electrode, and
   a center of the opening coincides with a center of the pixel electrode when viewed in a direction perpendicular to the first or second substrate, and protrusions are disposed on an elongation line of a diagonal of the rectangular pixel electrode outside corners of the pixel electrode, respectively.

2. The display panel of claim 1, wherein:
the length of the short side of the pixel electrode is greater than one-fourth of a length of a long side of the pixel electrode and is less than one-half of the length of the long side of the pixel electrode.

3. The display panel of claim 1, wherein:
the first substrate is further provided with a first orientation layer, and
the pixel electrode is covered by the first orientation layer.

4. The display panel of claim 3, wherein:
the first orientation layer is a vertical orientation layer.

5. The display panel of claim 1, wherein:
the second substrate is further provided with a second orientation layer, and
the common electrode and the opening are covered by the second orientation layer.

6. The display panel of claim 5, wherein:
the second orientation layer is a vertical orientation layer.

7. The display panel of claim 5, wherein:
the second orientation layer has a recess in a region corresponding to the opening.

8. The display panel of claim 1, wherein:
the protrusions have a height of 2 μm to 5 μm.

9. The display panel of claim 1, wherein:
the liquid crystal layer is a liquid crystal layer having negative dielectric anisotropy.

10. The display panel of claim 9, wherein:
the liquid crystal layer is a liquid crystal layer doped with a chiral agent.

11. The display panel of claim 10, wherein:
the pixel electrode and the common electrode are configured such that an electric field generated between the pixel electrode and the common electrode has a component that is parallel to the first substrate and the second substrate.

12. A display apparatus comprising:
the display panel of claim 1.

13. The display panel of claim 1, wherein:
the pixel electrode and the common electrode are configured such that an electric field generated between the pixel electrode and the common electrode has a component that is parallel to the first substrate and the second substrate.

* * * * *